March 10, 1953  E. R. ANDERSON  2,630,908
PROCESSING APPARATUS
Filed April 5, 1948  9 Sheets-Sheet 1

INVENTOR.
Earl R. Anderson
BY
ATTORNEY

March 10, 1953  E. R. ANDERSON  2,630,908
PROCESSING APPARATUS
Filed April 5, 1948  9 Sheets-Sheet 3

INVENTOR.
Earl R. Anderson
BY
Harper Allen
ATTORNEY

March 10, 1953     E. R. ANDERSON     2,630,908
PROCESSING APPARATUS

Filed April 5, 1948     9 Sheets-Sheet 4

INVENTOR.
Earl R. Anderson
BY
ATTORNEY

March 10, 1953 E. R. ANDERSON 2,630,908
PROCESSING APPARATUS
Filed April 5, 1948 9 Sheets-Sheet 5
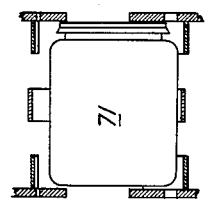
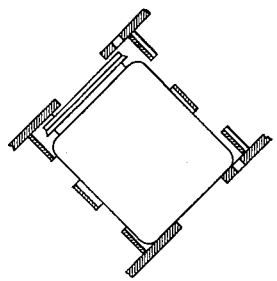
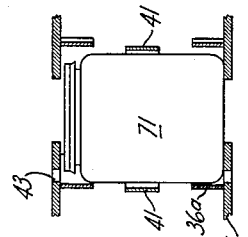
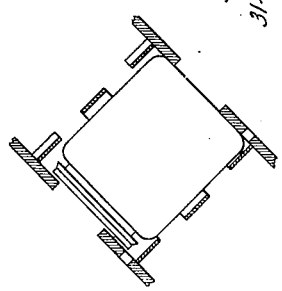
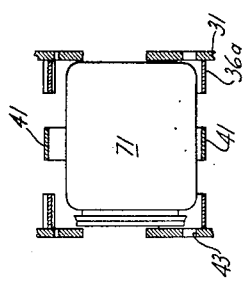
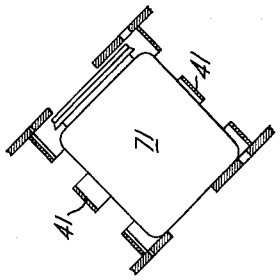
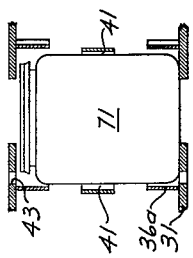
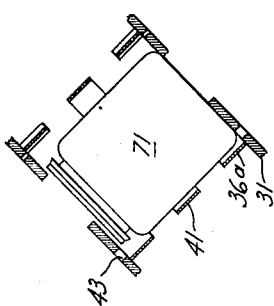
INVENTOR.
Earl R. Anderson
BY
ATTORNEY March 10, 1953  E. R. ANDERSON  2,630,908
PROCESSING APPARATUS Filed April 5, 1948  9 Sheets-Sheet 6

INVENTOR.
Earl R. Anderson
BY
Harper Allen
ATTORNEY

March 10, 1953     E. R. ANDERSON     2,630,908
PROCESSING APPARATUS
Filed April 5, 1948     9 Sheets-Sheet 7

INVENTOR.
Earl R. Anderson
BY
*Harper Allen*
ATTORNEY

March 10, 1953     E. R. ANDERSON     2,630,908
PROCESSING APPARATUS
Filed April 5, 1948     9 Sheets-Sheet 8

INVENTOR.
Earl R. Anderson
BY
ATTORNEY

March 10, 1953   E. R. ANDERSON   2,630,908
PROCESSING APPARATUS
Filed April 5, 1948   9 Sheets-Sheet 9

INVENTOR.
Earl R. Anderson
BY Harper Allen
ATTORNEY.

Patented Mar. 10, 1953

2,630,908

UNITED STATES PATENT OFFICE 2,630,908

PROCESSING APPARATUS

Earl R. Anderson, Campbell, Calif.

Application April 5, 1948, Serial No. 19,096

15 Claims. (Cl. 198—211)

The present invention relates to processing apparatus, such as cookers and coolers, for food in containers and is concerned more particularly with the provision of an automatic container feed mechanism for such apparatus.

In the processing of food in containers the two general types of feed mechanisms now in use comprise first a cylindrical tank with a spiral track about its periphery and a reel rotatable within the tank for propelling the containers around the tank so that they are advanced endwise by the helical track. In this type of container feed only a small part of the total space within the processing apparatus can be utilized because the containers are in a shell-like configuration within the tank. In the second type the containers are fed in the processing apparatus as a row and roll along reversely arranged tracks by gravity from the top to the bottom of a rectangular processing tank.

In all of these types of apparatus there are either of two major difficulties: in the first type only a small amount of usable space within the tank is employed, and in the second type, the containers hit each other more or less continuously and this type of apparatus cannot be employed with glass jars as the breakage loss is prohibitive.

In accordance with the instant invention the principal difficulties of existing processing apparatus as outlined above are eliminated and a feed mechanism is provided for containers which enables filling of substantially the entire processing space with containers and at the same time provides a segregated positive control of the containers in travelling through the tank so as to avoid the possibility of breakage. This is effected without the provision of special power driven conveying means and the travel of the containers is effected automatically in response to a cyclic movement of the processing tank itself. Also, advantage is taken of the force of gravity in producing a step-by-step progress of the containers through the processing path, or paths so that an economical feed arrangement, both from construction and from power requirements, is provided.

The above and other objects and advantages of the invention are contained in the following description of certain preferred embodiments thereof, as illustrated in the accompanying drawings, in which:

Figures 7a through 7e are schematic views illustrating the operation of a track for effecting automatic advance of a container.

Figures 8a through 8c are similar views with a modified movement of the processing structure.

Figure 1:
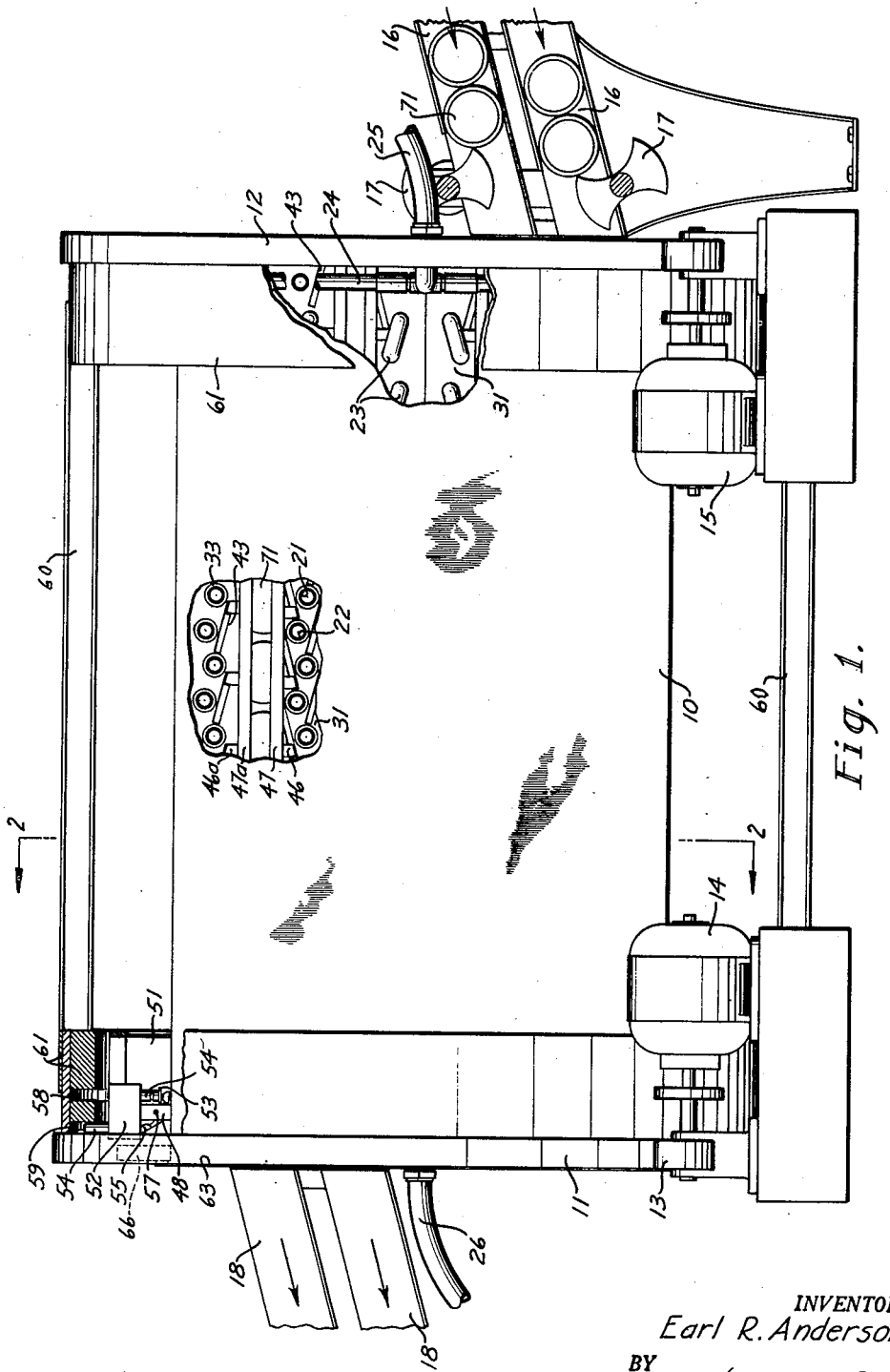
Figure 1 is a side elevational view of processing apparatus embodying the invention.
Figure 2:
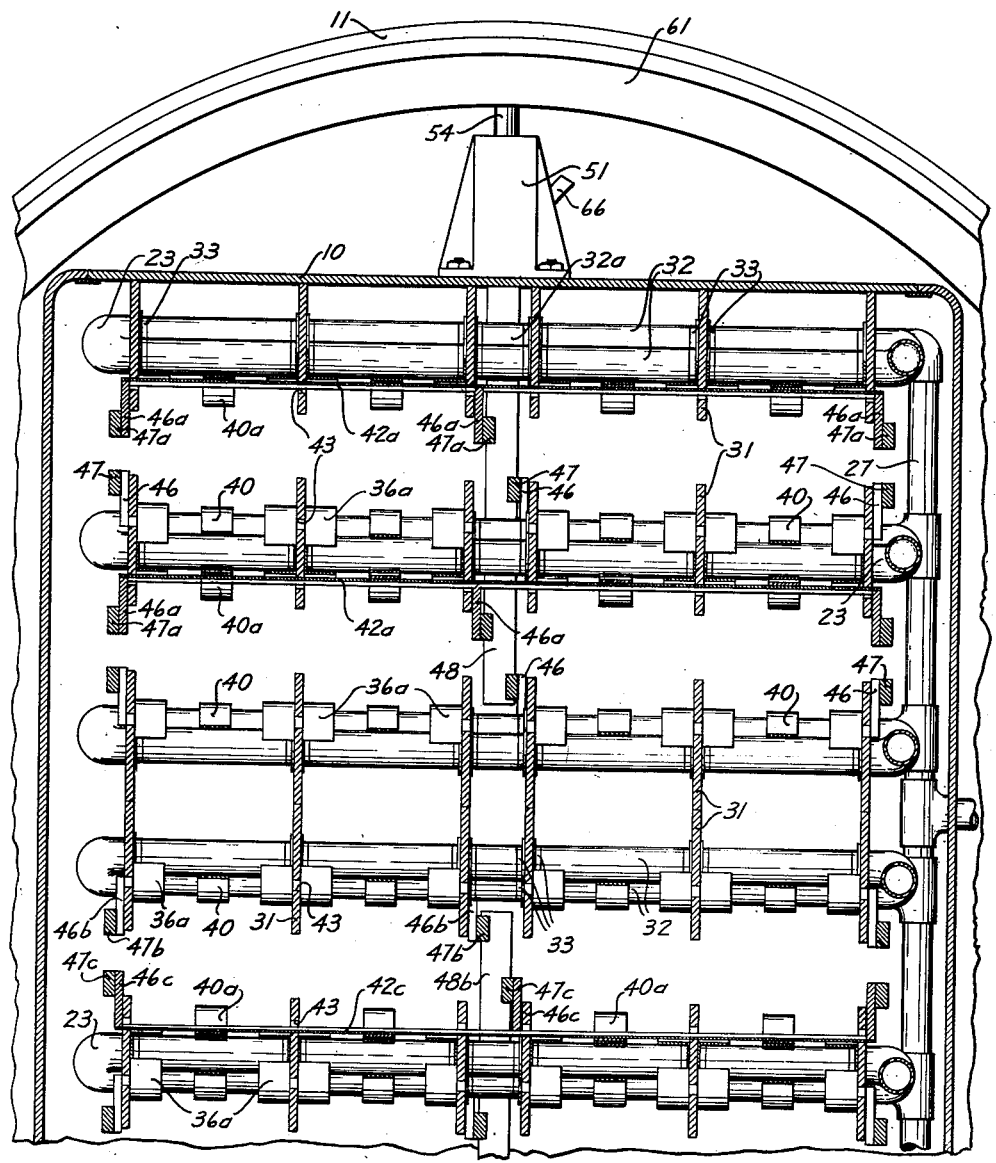
Figure 2 is a transverse sectional view of the apparatus taken as indicated by the line 2—2 in Figure 1.

Referring to Figures 1 and 2, there is illustrated processing apparatus including a substantially square casing or tank 10 having circular end flanges 11 and 12 supported in similar spaced rollers 13 with one roller 13 at each flange being connected to the drive shaft of electric motors 14 and 15, respectively. As seen in Figure 2, there are two horizontally spaced sets of tracks in both the lower and upper halves of the tank 10, the lower sets of tracks being aligned with respective upper and lower feed chutes 16 each having a series of double recessed feed control disks or wheels 17 associated therewith and mounted and controlled for intermittent half-rotations in a conventional fashion. Two discharge ramps 18 are associated with the upper sets of tracks at the discharge end of the tank.

In general, in the operation of the processing apparatus the motor 14 drives the tank 10 for a one-half revolution so that the respective positions of the respective upper and lower tracks are reversed. At this time the circuit of the motor 14 is interrupted and a dwell is provided in the movement of the tank for feeding and discharge of containers. Thereafter, the circuit for the motor 15 is energized so that a reverse movement takes place for one-half revolution. Any suitable circuit control means may be provided for the motor 14 and 15 to carry out the above-described operation. In other words, the motors 14 and 15 are one suitable means of providing a back and forth oscillation of the tank through 180° so that each of the tracks extending through the tank is successively positioned to receive a container and to discharge a container. Any other suitable means of obtaining this oscillation can be employed.

Referring to Figures 1 and 2, it will be seen that in the present embodiment the tank 10 is separated into four vertical divisions by the series of sets of pipes 21 and 22 which may carry the processing medium and which extend transversely between the sides of the tank. The series of pipes 21 of each set are at a slightly different elevation than the pipes 22 of the set for a purpose later described. The pipes 21 and 22 of each set are connected by U-shaped couplings 23 to provide a continuous zigzag conduit. The inlet end of each zigzag conduit is connected to a header 24 which is fed from a length of flexible tubing or hose 25 connected to a suitable source of a processing medium, such as water, steam, or the like. Similarly, the discharge ends of the conduits formed by the sets of pipes 21 and 22 are connected through a suitable header 27 to a discharge hose 26. The flexibility of the hoses 25 and 26 enables the swinging of the tank through the 180° oscillation without interfering with the supply and discharge of treating medium. If the treating medium is to be discharged into the tank for contact with the jars, then the pipes 21 and 22 may be perforated, or equipped with suitable spray nozzles.

The sets of pipes 21 and 22 also form part of the framework for the track system or structure of the feed mechanism. The framework also includes a plurality of longitudinal spacer strips or rails 31 (Figures 1, 2, 3 and 6) which extend transversely of the pipes 21 and 22 and are apertured to receive the pipes. The rails 31 are spaced apart by means including spacing sleeves 32 placed over the pipes 21 and 22 and end collars 33 similarly mounted on the pipes 21 and 22 and interposed between the spacing sleeves 32 and the rails. When the pipes 21 and 22 are perforated, the sleeves 32 are similarly perforated or slotted to expose the perforations of the pipes 21 and 22, or to provide for mounting of spray nozzles therein.

The dimensions of the sleeves 32 and collars 33 are selected so that the spaces between the rails 31 are slightly wider than the length of the container to be processed, and these spaces are employed to provide for tracks through the tank. The central sleeves 32a (Figure 2) are shorter than the sleeves 32 in the track spaces, and these central sleeves 32a provide a central control space for the rack structures.

Figure 3:
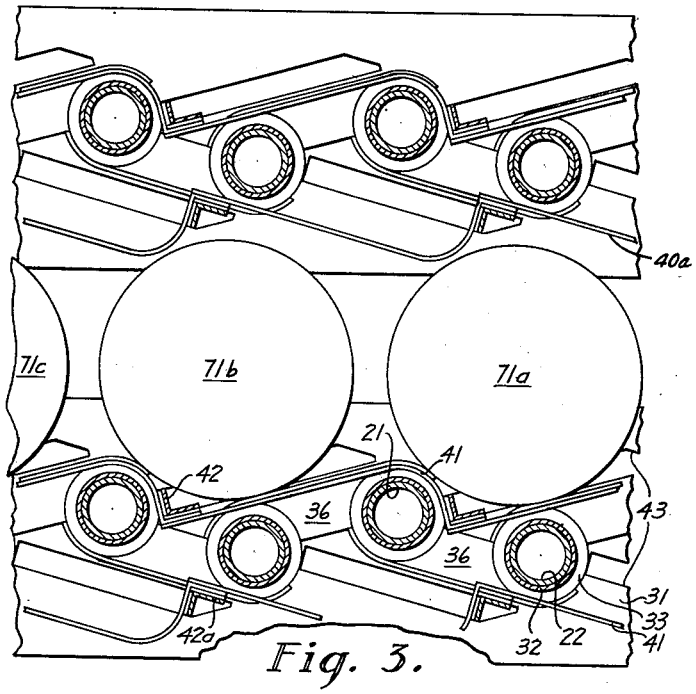
Figure 3 is an enlarged sectional view through one processing path of the apparatus illustrating the parts in one position of adjustment or travel thereof.
Figure 6:
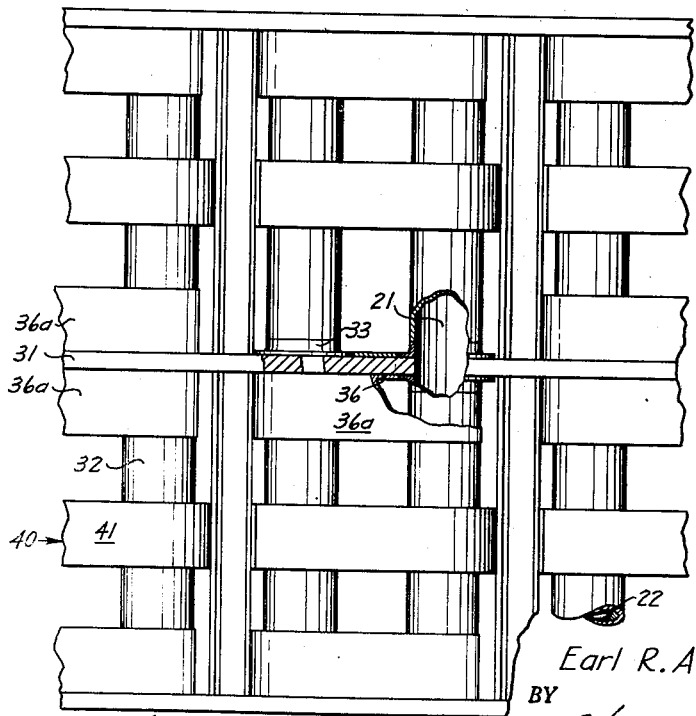
Figure 6 is a fragmentary plan view illustrating certain details of construction of the apparatus.

At each side of each space between adjacent rails 31 there are provided parallel similar track portions, as shown in Figures 3 and 6, made up of sheet metal angle segments 36 which are recessed to fit over an adjacent pair of collars 33 on the pipes 21 and 22 with a straight track section or flange 36a extending tangentially of the pipes and at an angle to the longitudinal axis of the track structure. The flange 36a terminates in respective curved end portions 36b and 36c which fit around respective adjacent collars 33. Thus the opposite sides of a trackway are formed of respective opposite inclined track sections or flanges 36a which provide a series of valleys or container stations for progression of the containers from valley to valley. Each trackway has both an upper and a lower track formed as described above. It will be noted that the upper half of the trackway has its valleys evenly staggered with respect to the valleys of the lower half of the trackway. In general, the outline of each track structure may be defined as of a rounded saw tooth configuration.

From the above description it will be seen that a container can be supported adjacent its ends on either the upper or lower part of the trackway, and the space between opposite track sections of each trackway is used for control purposes. In order to control the advance of containers along each track structure, there is provided a control strip or rack 40 (Figures 2 and 6) for each half of the track structure, and these control racks are of similar contour to the tracks. Each control rack 40 is formed of strip-like control segments 41 corresponding in saw tooth contour to the track segments and connected together to form an endless rack by spot welding or the like.

Each corresponding series of control racks or strips 40 in the same row of trackways is connected by respective transverse angle bars 42 guided in angularly disposed parallel slots 43 in the rails 31 so that the movement of each control rack is in a path parallel to the inclined track segments with which it is associated. As seen in Figure 3, the upper control rack or strip 40 moves at an angle to the axis of the container processing path opposite to the angle of the lower control rack 40 with respect to said path axis.

Figure 12:
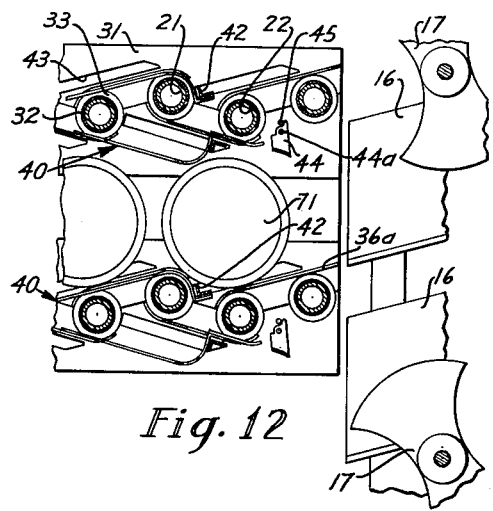
Figure 12 is a fragmentary sectional view showing the feed end of a track.

The feed end of a track structure is illustrated in Figure 12 where it is seen that the endmost track section or segment 36a in the lower container supporting position is in alignment with the cooperating feed chute 16 while the control rack 40 associated with this lowermost track does not extend beyond the adjacent or endmost angle bar 42. Also, in entering the track structure from the feed chute 16 the container wipes past a one-way gravity pawl 44 which is pivotally supported on a pivot rod 44a extending between an adjacent pair of rails 31 and normally is held by gravity against a stop pin 45. After a container has entered the track structure the pawl 44 will prevent its accidental dislodgement out of the end of the structure. Also, the endmost section of the upper control rack 40 in Figure 12 is shorter in length than the normal section of the rack to avoid interference with the adjacent pawl 44.

Figure 11:
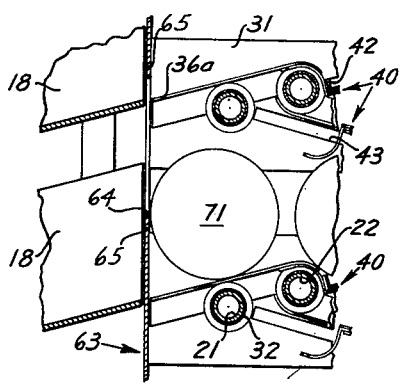
Figure 11 is a fragmentary sectional view showing the discharge end of a track.

At the discharge end of each track structure, as shown in Figure 11, the end track segment 36a is extended and is in alignment with the discharge ramp 18, the lowermost control rack 40 stops at its adjacent transverse support angle bar 42, while the uppermost rack 40 is extended beyond the endmost bar 42 for the extent of the curved portion which mates with the endmost pipe 21 and spacer sleeve 32 of the upper set of pipes 21 and 22. As will be apparent from the description of the operation, this provides for transfer of the endmost container into position for discharge onto the ramp 18.

As seen in Figures 1 and 2, the series of angle bars 42 connecting the respective parallel series of lower control racks 40 in the two upper sets of tracks are each connected at their ends and intermediate their ends by a bracket 46 to a longitudinal connecting bar 47. Also, the intermediate bars 47 of the two upper series of control racks 40 in each trackway are secured in corresponding recesses of a vertical operating bar 48. Similarly, the upper series of angle bars 42a of each of the two sets of upper track structures are connected by brackets 46a with longitudinal connecting bars 47a and the intermediate bars 47a of each track structure are connected to a vertical operating bar (not shown) similar to the bar 48 but at the opposite end of the machine. Similarly the two lower sets of track structures as viewed in Figure 2 have their respective sets of angle bars 42c and 42b connected by brackets 46c and 46b, respectively, to connecting bars 47c and 47b, respectively. In turn bars 47c and 47d are secured to operating bar 48b and a similar bar (not shown) at the opposite end of the machine.

As seen in Figure 1, the operating bar 48 extends through the casing or tank 10 and is guided in a guide bracket 51 mounted on the casing 10. The upper end of the operating bar 48 (Figures 1 and 16) is T-shaped at 52 and carries a pair of pins 53 slidably mounted therein having cam follower rollers 54 thereon. Each pin 53 is provided with a latch groove to cooperate with a spring-urged latch pin 56 in the head 52 of the bar and the two cam rollers 54 are alternately operable under the control of a bellcrank lever 55 pivoted at 57 on the bar 48. The rollers 54 cooperate with respect to the cam slots 58 and 59 in a cam track member 61 which extends circumferentially around the tank 10. There is a cam track member 61 at each end of the machine, and these members are connected by suitable longitudinal braces 60 (Figure 1).

Figure 14:
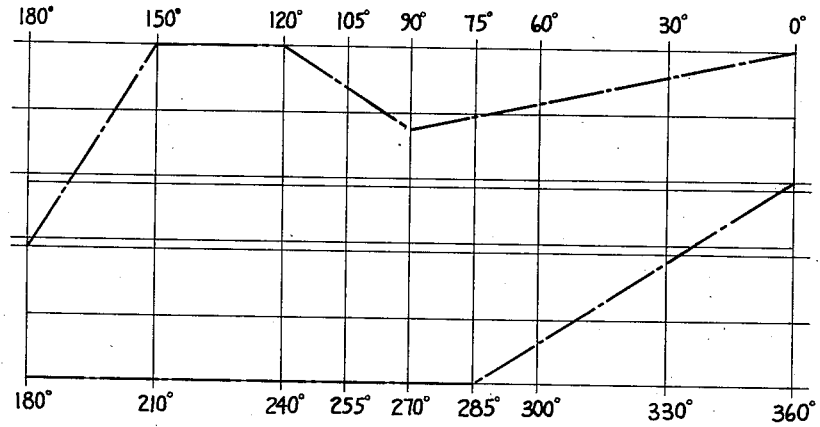
Figure 14 is a diagram showing the path of movement of a control rack in effecting a one-step advance of the container.
Figure 16:
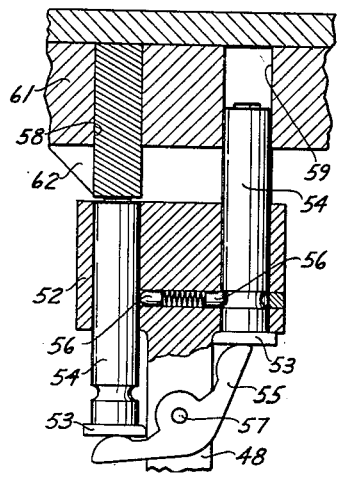
Figure 16 is a sectional detail view of the cam follower construction for controlling movement of the racks.

The roller 54, as shown in Figure 16, which is in operative relation with the cam slot 59 is in active position during clockwise movement of the tank for 180° from the position shown in Figure 2 when the end of the roller 54 engages a cam 62 (Figure 16) which depresses the right-hand roller 54 and through the bellcrank 55 elevates the left-hand roller 54 so that the left-hand roller with its cam groove 58 will be in control of the movement of the racks during the return 180° movement of the tank. As seen in Figure 2, the roller 54 has just been depressed at the end of this return movement. The configuration of the respective cam grooves 58 and 59 is illustrated schematically in Figure 14, one of these grooves corresponding to the desired endwise movement of a set of control racks 40 that starts its movement as a lower set of racks. The other groove corresponds to the desired movement of a set of control racks 40 that starts its movement as an upper set of such racks.

The connecting bars 47a, 47b and 47c of the respective sets of bars 42a, 42b and 42c are connected to their respective operating bars 48a, 48b and 48c in the same manner as described in connection with the connecting bars 47 and the operating bar 48, so that the control racks operated thereby are given the same movement at the appropriate time in the cycle of operation as that given to the racks controlled by the operating bar 48 and the cam tracks or grooves 58 and 59. Each cam track 58 or 59 is of sufficient depth to accommodate the endwise component of movement of the operating bar 48 as the angle bars 42 move along their inclined slots. It will be understood that suitable cam tracks similar to the cam tracks 58 and 59 seen at the left of Figure 1 are provided at the opposite end thereof.

Figure 15:
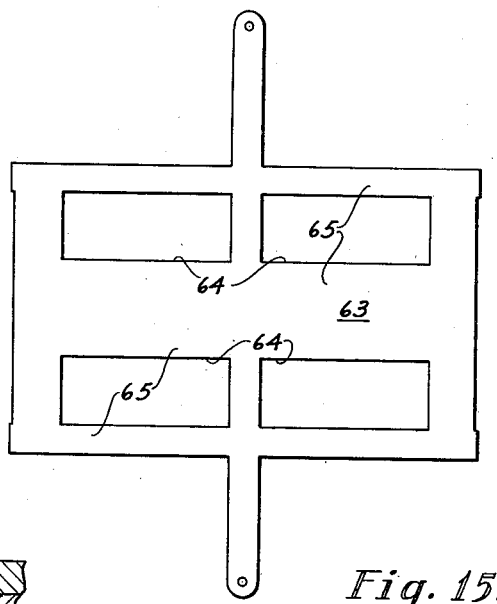
Figure 15 is an elevational view of the discharge gate.

To control the discharge of the containers from the various track structures thereof while the track structure is oscillating in effecting the feed of containers, a discharge control gate 63 (Figures 11 and 15) is mounted at the discharge end of the casing 10 and is provided with a plurality of openings 64 corresponding to the discharge openings of the various track structures, these openings being defined in part by spaced blocking strips 64 which are employed to prevent discharge of the containers until the desired alignment is effected between a track structure and its associated discharge ramp 18. The gate 63 is mounted in suitable fashion for sliding movement on the track structure and moves under control of a cam 66 (Figures 1 and 2) which holds the gate in position to block discharge of the containers until the track structures have arrived at their discharge position when the blocking strips 65 associated with the upper set of track structures are moved to inactive position to permit the endmost containers to roll onto the respective discharge ramps 18. The movement of the gate 63 to discharging positions preferably occurs during the last seven or eight degrees of movement of the tank before arriving at loading and discharging positions.

*Operation*

In general, the track structure disclosed herein operates to effect a step-by-step feed of a file of containers, such as glass jars or tin cans, through a processing chamber where they may be subjected to a heating or cooling operation. The step-by-step progression of a container is effected in response to an oscillatory movement of the track structure and the tank so that the container is moved back and forth between the opposite tracks and at the same time is advanced longitudinally of the track structure each time it engages and travels down a track segment.

The feed of the jars 71 from the feed chutes 16 is effected with a transverse row of four jars in both the upper and lower feed chutes, but the operation will be described in connection with one jar. Similarly, the description of the operation will be confined to one track structure it being understood that the other track structures operate in the same manner. With the tank 10 at rest after oscillation in one direction, the feed wheel 17 is rotated for one-half turn so that the endmost jar 71 rolls into the aligned track structure moving past the one-way pawl device 44, and coming to rest in the initial valley of the lowermost track. The remaining jars on the feed chute 16 are restrained by the feed wheel 17. This jar 71 then occupies the same relative position as the jars 71a, etc. in Figure 3 illustrating an intermediate part of the track structure.

Figure 10C:
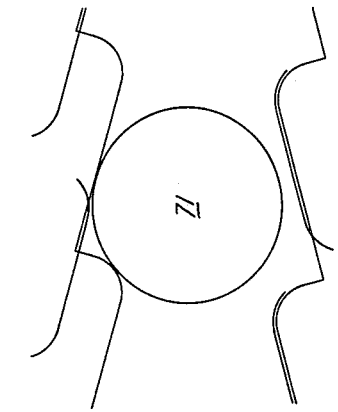
Figures 10a and 10f are schematic views illustrating the operation of the track during a step advance of a container and correspond to various positions shown in Figure 9.
Figure 10F:
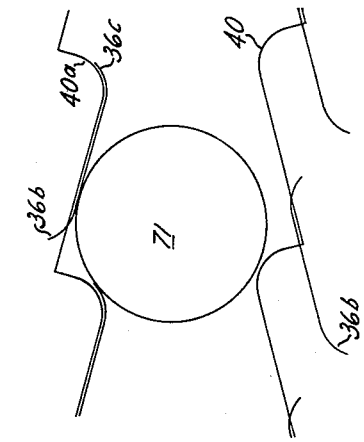
Figure 10B:
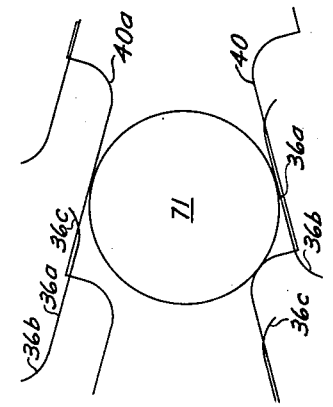
Figure 10E:
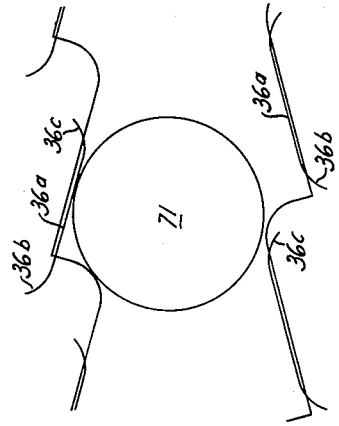
Figure 10A:
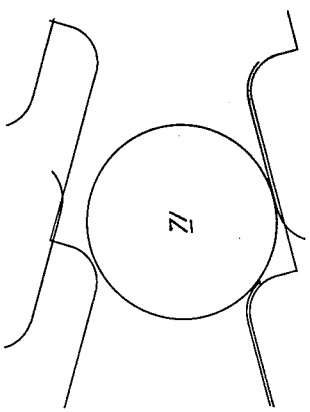
Figure 10D:
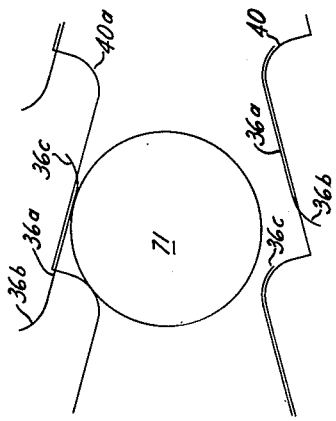

As seen in Figure 3, the jars 71a, 71b and 71c are resting in the respective valleys of the lower track and the control rack 40 associated therewith is in its lowermost position, so that the jars have just concluded rolling down the segmental track sections (under control of the associated rack 40) leading into the valleys in which they are resting and are ready for transfer (during the next oscillation of the processing apparatus) to the track structure including the control rack 40a at the upper part of Figures 3 and 10a which it will be seen is advanced to its rightmost position in this figure. It will be noted that in this position of the parts the upper rack 40a blocks over travel of a jar and thereby prevents hitting and consequent breakage of jars. A corresponding position of the parts is shown in Figure 7a.

Figure 4:
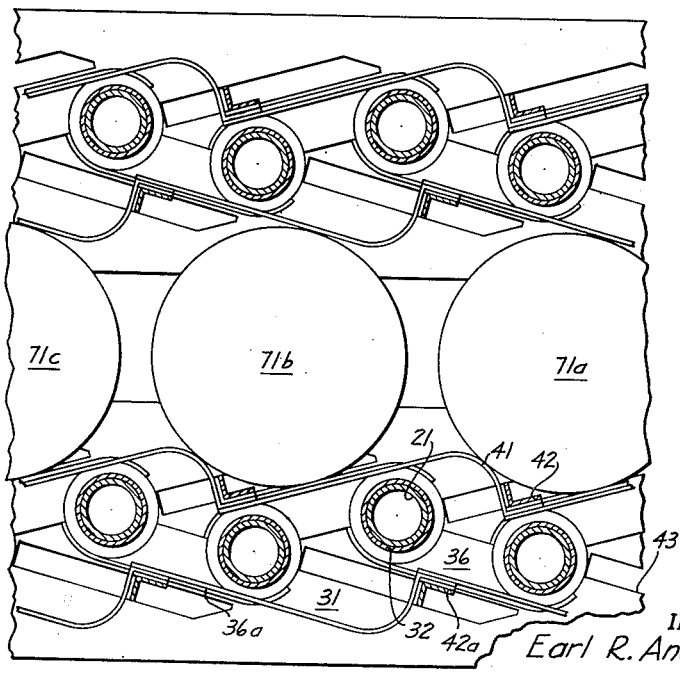
Figure 4 is a view similar to Figure 3 showing the parts in another position.
Figure 5:
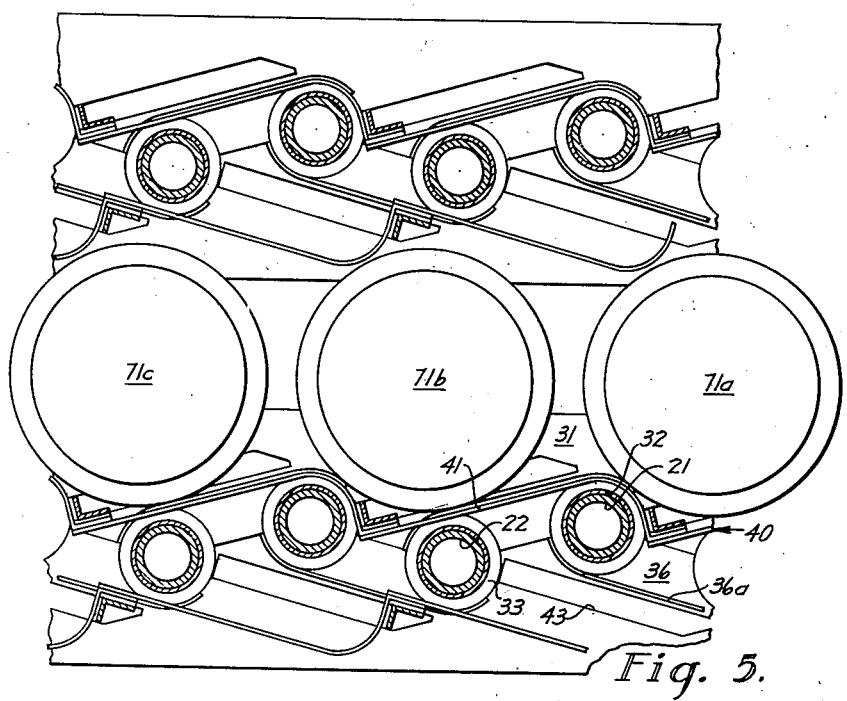
Figure 5 is a view similar to Figures 3 and 4, but showing the condition of the parts in an inverted relation with respect thereto.
Figure 9:
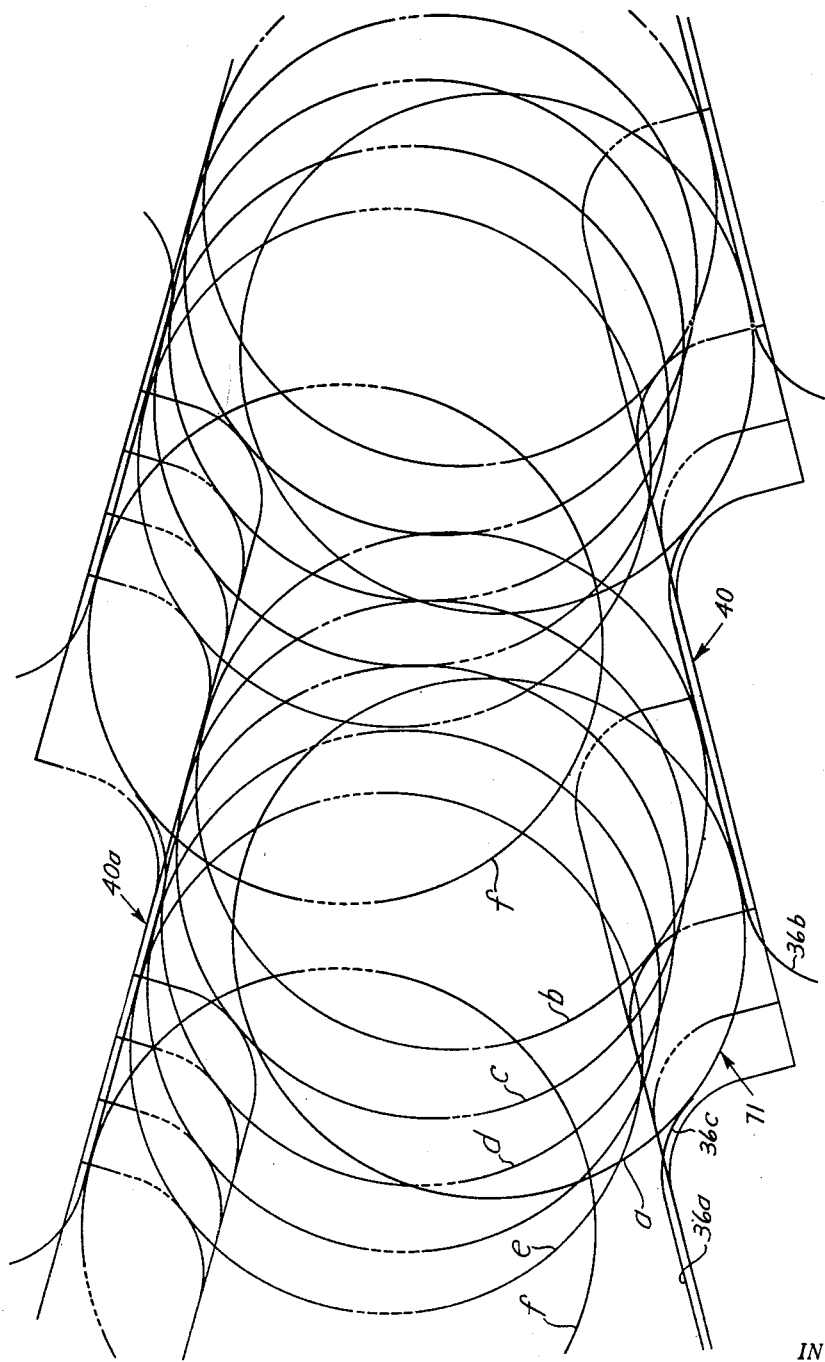
Figure 9 is a schematic view illustrating the progression of the container and the control strips in relation thereto in effecting a one step advance of the container.

As the structure begins to oscillate clockwise, as viewed in Figure 7a, the jar is tilting and slides endwise (Figure 7b) so that its weight is supported partially against the adjacent pair of rails 31 and is in part removed from the track sections, and in Figure 7c the jar is entirely supported by the rails. At this point in the operation, the respective opposite control racks 40 have moved from the positions shown in Figure 3 to the positions shown in Figures 4 and 10b, i. e., position b of Figure 9. In this condition of the parts, the lower control rack 40 is advanced so that the jar, as seen in Figures 4, 9 and 10b, is firmly supported between the upper and lower control racks. This operation occurs at about the time or just before the jar arrives in its upright position at Figure 7c, so that its weight can be transferred from one control rack to the other with no possibility of a drop which would cause breakage of the jars. Subsequently, as the tilting of the jars continues, as shown in Figures 7d and 7e, the control rack 40a becomes the lower rack, as shown in Figures 5, 7e, 9 and 10c.

The diagrammatic views shown in Figure 9 illustrate the various movement of the upper and lower control racks and of the container being transferred from one rack to the other, the starting position being shown in full lines in each instance, the transfer or No. 1 position being shown in a line with one dash, the No. 2 with two dashes, the No. 3 with three dashes, etc. In a part of Figure 9 and Figures 10c through 10f the parts are shown in inverted position with respect to their actual position in the machine and in the remainder of the drawings so that the comparative positions of the parts will remain the same as seen in Figures 10a and 10b.

It will be noted that in Figure 10c the control rack 40 (which is now uppermost) has returned to the same position as shown in Figure 10a (as also seen in position No. 2 in Figure 9) so that it will be out of the path of the jar in moving down the adjacent track section under control of the rack 40a. The No. 4 position of the parts, as seen in Figure 9, corresponds to Figure 10d and shows the maximum clearance between the rack 40 and its associated track structure 42 and the jar in travelling down the opposed track structure 42a under control of the rack 40a. This movement of the jar continues, as shown in Figures 10e and position No. 5 of Figure 9, but the upper rack 40 has started its advance and this position illustrates the minimum clearance existing between the jar and the opposite control rack.

The No. 6 position of Figure 9 is shown also in Figure 10f and shows the jar at the end of its step of movement along the track structure 42a while the upper rack 40 (shown lowermost in Figure 10a) has been advanced so that it occupies the same relative position to the jar as the position of the rack 40a in Figure 10a. In other words, the cycle of control of the parts during 180° rotation in one direction has been completed and during the return movement of the tank to 180° the same sequence of movement of the parts will occur with the exception that the functions of the control racks 40 and 40a are reversed. In this connection, it will be recalled that the cam track 58 controls the movement of the control racks 40a in one direction while the cam track 59 controls their movement in the other direction. Similarly the cam tracks for controlling the racks 40 are similar for the respective movements in either direction.

From the foregoing description it will be seen that as the tank structure is oscillated back and forth the jars in each track structure are transferred back and forth between the opposite tracks thereof so that in each instance they have a gravity descent of a track section under the control of the cam structure as illustrated. Also, the end jar of each file in a track structure at the end of a complete oscillatory movement will become aligned with the discharge chute 18 and, when the barrier provided by the perforated gate or plate 61 is withdrawn, will be discharged along the chute 18 for further processing or for casing.

It will be appreciated from the foregoing description that the step-by-step advance of jars or other containers along a track structure of the character disclosed herein does not require a full 180° oscillation. As illustrated in Figures 8a through 8c, the advance can be accomplished with a shorter oscillation of the track structure as it is only necessary for the weight of the jars to be transferred from one track to the opposite track during the oscillatory movement. It is also to be noted that the same jar advancing operation can be effected by rotation of the tank or track structure through 360° by appropriate modification of the cam structure and the feed and discharge lines for the processing medium.

It will also be appreciated that the control racks 40 and the tracks 36 can be interchanged as to position so that a single stationary track engages the center of the containers and their ends are engaged by the movable control racks. While it is desirable to produce agitation of the containers during their movement in many processing steps and for this purpose in the present embodiment, the tracks 36 extend slightly above the control racks 40 in the direction of the containers in order to insure rotation or agitation of the containers as they move with the control racks. In some cases where no agitation is desirable it would be possible to eliminate the agitating function.

Figure 13:
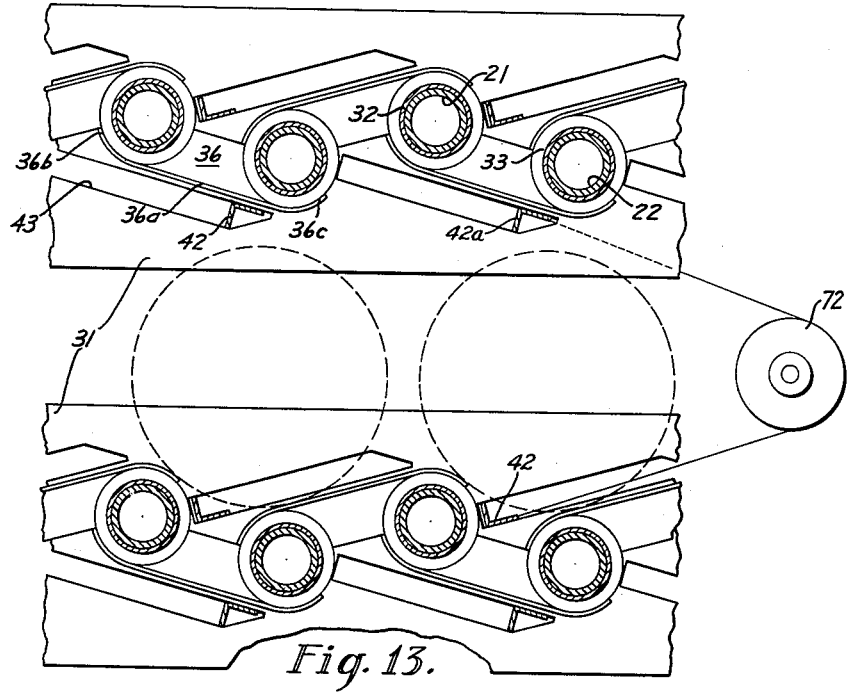
Figure 13 is a fragmentary sectional view similar to Figure 3 illustrating a modified form of the invention in which the opposed control racks of each track structure move together and oppositely in controlling feeding of the containers or jars.

Figure 13 illustrates a modified construction which can be employed where the jar or container construction is such that breakage is not a problem. In this view, which corresponds generally to Figure 3, the opposite tracks of the track structure are spaced sufficiently apart that there is no possibility of interference between a control rack travelling in one direction and a jar or other container travelling down the opposite track under control of the opposite rack. In this modification an opposite pair of the transverse angle bars 42 of the opposite control racks are connected together for simultaneous opposite movement, for example, by means of a cable structure illustrated schematically at 72. In this construction as one rack travels downwardly along its supporting slots under the weight of the containers thereon, the opposite rack travels downwardly in the opposite direction to a position to receive the containers upon the next oscillation. In this way the gravity travel of a control rack loaded with jars down its inclined guideway effects a restoration of the opposite empty control rack into position to receive the containers for the next step of movement.

With respect to the modification of the invention shown diagrammatically in Figures 8a through 8c wherein the tilting of the track structure is reduced in extent to an amount sufficient to transfer the weight of the jar between the opposite control racks 41, it will be appreciated that this type of structure can be employed as a single file step-by-step container feed mechanism.

While I have shown certain preferred embodiments of the invention, it will be understood that the invention is capable of variation and modification from the form shown so that its scope should be limited only by the scope of the claims appended hereto.

I claim:

1. In processing apparatus for food in containers, a track structure mounted for tilting movement about a longitudinal axis, said track structure including opposite longitudinal tracks of generally saw-tooth contour to provide a series of inclined track sections in each track, the sections of each track being equally and oppositely inclined with respect to said longitudinal axis and the respective tracks having their track sections longitudinally offset with respect to each other, and container control means in said track structure for each track for controlling back and forth step-by-step movement of the container from section to section of said tracks during tilting movement of the track structure, each of said container control means being mounted for movement in a direction substantially parallel to the track sections of the associated track.

2. In processing apparatus for food in containers, a track structure mounted for tilting movement about a longitudinal axis, said track structure including opposite longitudinal tracks of generally saw-tooth contour to provide a series of inclined track sections in each track, and a container control rack mounted adjacent each track for reciprocation in a path parallel to the associated track section for controlling back and forth step-by-step movement of the container from section to section of said tracks during tilting movement of the track structure.

3. In processing apparatus for food in containers, a track structure mounted for tilting movement about a longitudinal axis, said track structure including opposite longitudinal tracks of generally saw-tooth contour to provide a double row of inclined track sections in each track, and a container control rack mounted between the rows of track sections of each track for reciprocation in a path parallel to the associated track sections for controlling back and forth step-by-step movement of the container from section to section of said tracks during tilting movement of the track structure, each of said racks including inclined rack sections of said saw-tooth contour and disposed to coincide with said track sections at one end of the path of travel of the rack and each rack section being disposed to form a continuation of the associated parallel track sections when moved away from said one end of the path of travel of the rack.

4. In processing apparatus for food in containers, a track structure mounted for tilting movement about a longitudinal axis, said track structure including opposite longitudinal tracks of generally saw-tooth contour to provide alternate valleys and rises in each track, the valleys of said opposite tracks being staggered with respect to each other to enable step-by-step progression of a container in transferring back and forth between the valleys of said tracks, and container control means in said track structure for controlling step-by-step movement of containers from valley to valley of said tracks during tilting movement of the track structure, said container control means comprising a rack associated with each track and mounted for movement between respective advanced and retracted positions with respect to the associated track.

5. In processing apparatus for food in containers, a track structure mounted for tilting movement about a longitudinal axis, said track structure including opposite longitudinal sets of double tracks of generally saw-tooth contour to provide alternate valleys and rises in each track, each double track being positioned to engage a container adjacent its ends, the valleys of said opposite tracks being staggered with respect to each other to enable step-by-step progression of a container in transferring back and forth between the valleys of said tracks, and a container control rack mounted between the tracks of each set for controlling step-by-step movement of containers from valley to valley of said tracks during tilting movement of the track structure.

6. In processing apparatus for food in containers, a track structure mounted for tilting movement about a longitudinal axis, said track structure including opposite longitudinal sets of double tracks of generally saw-tooth contour to provide alternate valleys and rises in each track, each double track being positioned to engage a container adjacent its ends, the valleys of said opposite tracks being staggered with respect to each other to enable step-by-step progression of a container in transferring back and forth between the valleys of said tracks, a container control rack mounted between the tracks of each set for controlling step-by-step movement of containers from valley to valley of said tracks during tilting movement of the track structure, and means for controlling said racks to engage both of said racks with a container as its weight shifts from one to the other of the tracks during said tilting movement.

7. In processing apparatus for food in containers, a track structure mounted for tilting movement about a longitudinal axis, said track structure including opposite longitudinal tracks of generally saw-tooth contour to provide alternate valleys and rises in each track, a container progressing and control rack for each of said tracks and having a substantially similar contour, and means for operating said racks to effect progression of a container back and forth between said opposite tracks in a step-by-step progression along said track structure, said last named means including means for positioning said control racks to engage a container simultaneously during transfer of the container from one track to the other.

8. In processing apparatus for food in containers, a track structure mounted for tilting movement about a longitudinal axis, said track structure including opposite longitudinal tracks of generally saw-tooth contour to provide alternate valleys and rises in each track, container control means in said track structure including a rack for each track for controlling back and forth step-by-step movement of a container from valley to valley of said tracks during tilting movement of the track structure, and control mechanism for said racks for effecting transfer of a container from one track to the opposite track during the period of the tilting movement in which the container is supported on an end.

9. In processing apparatus for food in containers, a track structure mounted for tilting movement about a longitudinal axis, said track structure including opposite longitudinal tracks of generally saw-tooth contour to provide alternate valleys and rises in each track, container control means in each of said tracks for effecting back and forth step-by-step movement of the container from valley to valley of said tracks during tilting movement of the track structure, each of said container control means being mounted for movement between retracted and advanced positions thereof, and control mechanism for said container control means for controlling simultaneous timed movement thereof to effect transfer of a container from one track to the opposite track during the period of the tilting movement in which the container is supported on an end.

10. In processing apparatus for food in containers, a track structure mounted for tilting movement about a longitudinal axis, said track structure including opposite longitudinal tracks of generally saw-tooth contour to provide alternate valleys and rises in each track, opposite container control racks in said track structure for controlling back and forth step-by-step movement of the container from valley to valley of said tracks during tilting movement of the track structure, said racks being mounted for limited movement along respective inclined paths in divergent relation to the longitudinal axis of the track structure, and control mechanism for positioning said racks to cause transfer of a container from one track to the opposite track during the period of the tilting movement in which the container is supported on an end.

11. In processing apparatus for food in containers, a structure mounted for tilting movement about a longitudinal axis, said structure including opposite longitudinal container progressing and control elements of generally saw-tooth contour to provide alternate valleys and rises in each element, said elements being mounted for movement along respective inclined paths with respect to said axes, and means for operating said elements to effect movement of a container back and forth between said opposite elements in a step-by-step progression along said structure.

12. In processing apparatus for food in containers, a structure mounted for tilting movement about a longitudinal axis, said structure including opposite longitudinal container progressing and control elements of generally saw-tooth contour to provide alternate valleys and rises in each element, said elements being mounted for movement along respective inclined paths with respect to said axes, and means for effecting a timed endwise movement of said elements in cyclic relation to the tilting movement of the structure to control movement of a container back and forth between said opposite elements in a step-by-step progression along said structure.

13. In processing apparatus for food in containers, a track structure mounted for tilting movement about a longitudinal axis, said track structure including opposite longitudinal tracks of generally saw-tooth contour to provide alternate valleys and rises in each track, and respective opposite container control racks in said track structure mounted for limited movement along respective inclined paths in divergent relation to the longitudinal axis of the track structure, said racks being connected for simultaneous opposite movement to control step-by-step movement of a container from valley to valley of said tracks during tilting movement of the track structure.

14. In processing apparatus for food in containers, a track structure mounted for tilting movement about a longitudinal axis, said track structure including opposite longitudinal tracks of generally saw-tooth contour to provide alternate valleys and rises in each track, and respective opposite container control racks in said track structure mounted for limited movement along respective inclined paths in divergent relation to the longitudinal axis of the track structure to control step-by-step movement of a container from valley to valley of said tracks during tilting movement of the track structure.

5. In a processing apparatus for food in containers, a track structure mounted for tilting movement about a longitudinal axis, said structure including opposite longitudinal container progressing and control elements of generally saw-tooth contour to provide alternate valleys and rises in each element, said elements being mounted for movement along respective divergent inclined paths with respect to said axis, with the inclination of each path corresponding generally to an inclined portion of the associated element, and means for effecting a timed endwise movement of said elements in cycled relation to the tilting movement of the structure to control movement of the container back and forth between said opposite elements in a step-by-step progression along said structure, said movement effecting means including means for effecting simultaneous engagement of said elements with the container at the time the container is supported on its end in being transferred from one of said elements to the other.

EARL R. ANDERSON.

REFERENCES CITED

The following references are of record in the file of this patent:

UNITED STATES PATENTS

| Number | Name | Date |
|---|---|---|
| 1,086,194 | Marquis | Feb. 3, 1914 |
| 1,153,177 | Keast | Sept. 7, 1915 |
| 1,249,771 | Kevlin | Dec. 11, 1915 |
| 1,437,882 | Barrows | Dec. 5, 1922 |
| 1,488,252 | House | Mar. 25, 1924 |
| 1,520,187 | Lawson | Dec. 23, 1924 |
| 1,630,438 | Layland | May 31, 1927 |
| 1,676,714 | Smallidge | July 10, 1928 |